(12) United States Patent
Kang et al.

(10) Patent No.: US 11,757,163 B2
(45) Date of Patent: Sep. 12, 2023

(54) TERMINAL COVER AND BATTERY PACK COMPRISING SAME

(71) Applicant: LG Chem, Ltd., Seoul (KR)

(72) Inventors: Tae-Young Kang, Daejeon (KR); Do-Hyeon Kim, Daejeon (KR); Jun-Yeob Seong, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 120 days.

(21) Appl. No.: 16/612,151

(22) PCT Filed: Jan. 2, 2019

(86) PCT No.: PCT/KR2019/000054
§ 371 (c)(1),
(2) Date: Nov. 8, 2019

(87) PCT Pub. No.: WO2019/143048
PCT Pub. Date: Jul. 25, 2019

(65) Prior Publication Data
US 2020/0176734 A1 Jun. 4, 2020

(30) Foreign Application Priority Data
Jan. 19, 2018 (KR) ........................ 10-2018-0007044

(51) Int. Cl.
*H01M 50/296* (2021.01)
*H01M 50/591* (2021.01)
*H01M 50/588* (2021.01)

(52) U.S. Cl.
CPC ....... *H01M 50/591* (2021.01); *H01M 50/296* (2021.01); *H01M 50/588* (2021.01)

(58) Field of Classification Search
CPC .. H01M 50/20; H01M 50/545; H01M 50/543; H01M 50/147; H01M 50/15;
(Continued)

(56) References Cited

U.S. PATENT DOCUMENTS

| 6,426,465 B1 | 7/2002 | Kosuge |
| 2012/0214034 A1 | 8/2012 | Minokawa |

(Continued)

FOREIGN PATENT DOCUMENTS

| CN | 102386343 A | 3/2012 |
| CN | 102646796 A | 8/2012 |

(Continued)

OTHER PUBLICATIONS

Lee et al; KR 100792416 B1; ESpacenet Machine Translation (Year: 2008).*

(Continued)

*Primary Examiner* — Dustin Q Dam
*Assistant Examiner* — Charlene Bermudez
(74) *Attorney, Agent, or Firm* — Birch, Stewart, Kolasch & Birch, LLP

(57) ABSTRACT

Disclosed is a terminal cover, which covers a terminal of a battery pack and is detachably mounted to the battery pack. The terminal cover includes a cover body coupled to a pack case of the battery pack by hook coupling, and a detachment guide unit provided at both side surfaces of the cover body to allow the hook coupling of the cover body to be released based on pressing by a user.

9 Claims, 5 Drawing Sheets

(58) Field of Classification Search
CPC .. H01M 50/155; H01M 50/16; H01M 50/172; H01M 50/176; H01M 50/204; H01M 50/209; H01M 50/276; H01M 50/55; H01M 50/553; H01M 50/561; H01M 50/571; H01M 50/572; H01M 50/591; H01M 50/145; H01M 50/24; H01M 50/278; H01M 50/28; H01M 50/296; H01M 50/236; H01M 50/238; H01M 50/559; H01M 50/56
USPC .............................................................. 429/65
See application file for complete search history.

(56) References Cited

U.S. PATENT DOCUMENTS

| | | | | |
|---|---|---|---|---|
| 2013/0034765 | A1* | 2/2013 | Kowalski | H01R 13/642 |
| | | | | 429/100 |
| 2013/0062098 | A1* | 3/2013 | Ikeda | H01M 50/543 |
| | | | | 174/138 F |
| 2013/0164599 | A1* | 6/2013 | Kim | H01M 10/0413 |
| | | | | 429/158 |
| 2016/0336577 | A1 | 11/2016 | Eom et al. | |
| 2018/0145289 | A1 | 5/2018 | Yu et al. | |
| 2018/0175342 | A1* | 6/2018 | Kim | H01M 50/271 |

FOREIGN PATENT DOCUMENTS

| | | | | |
|---|---|---|---|---|
| DE | 19819365 | A1 * | 11/1999 | ......... H01M 50/598 |
| JP | 2000-255608 | A | 9/2000 | |
| JP | 2004-119340 | A | 4/2004 | |
| JP | 2006-147415 | A | 6/2006 | |
| JP | 2007-109577 | A | 4/2007 | |
| JP | 2009-204367 | A | 9/2009 | |
| JP | 2016-154081 | A | 8/2016 | |
| KR | 20-1993-0007539 | U | 4/1993 | |
| KR | 10-2001-0017452 | A | 3/2001 | |
| KR | 10-2004-0038094 | A | 5/2004 | |
| KR | 20-0407849 | Y1 | 2/2006 | |
| KR | 100792416 | B1 * | 1/2008 | |
| KR | 10-1003962 | B1 | 12/2010 | |
| KR | 10-2015-0086925 | A | 7/2015 | |
| KR | 10-2015-0136842 | A | 12/2015 | |
| KR | 10-2016-0072312 | A | 6/2016 | |
| KR | 10-2017-0073170 | A | 6/2017 | |
| WO | WO 2017/111280 | A1 | 6/2017 | |

OTHER PUBLICATIONS

Welcker; DE 19819365 A1; ESpacenet Patent Translate (Year: 1999).*
Welcker et al; "Description DE19819365A1"; Machine Translation of DE 19819365 A1 obtained from ESpacenet Patent Translate (Year: 1999).*
European Search Report issued in European Patent Application No. 19741471.7, dated Oct. 15, 2020.

* cited by examiner

TERMINAL COVER AND BATTERY PACK COMPRISING SAME

CROSS-REFERENCES TO RELATED APPLICATIONS

This application is a U.S. national phase application, pursuant to 35 U.S.C. § 371 of PCT/KR2019/000054, filed Jan. 2, 2019, designating the United States, which claims priority to Korean Application No. 10-2018-0007044, filed Jan. 19, 2018. The entire contents of the aforementioned patent applications are incorporated herein by this reference.

TECHNICAL FIELD

The present disclosure relates to a terminal cover and a battery pack including the terminal cover.

BACKGROUND ART

Secondary batteries which are highly applicable to various products and exhibit superior electrical properties such as high energy density and the like are commonly used not only in portable devices but also in electric vehicles (EVs) or hybrid electric vehicles (HEVs) powered by electrical power sources. The secondary battery is drawing attentions as a new energy source with improved environment friendliness and energy efficiency in that the use of fossil fuels can be significantly reduced and no byproduct is generated during energy consumption.

Secondary batteries widely used at present include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.6V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. Thus, the number of battery cells included in the battery pack may be variously configured based on the required output voltage or charge/discharge capacity.

Meanwhile, when a plurality of battery cells are connected in series or in parallel to configure a battery pack, it is common to configure a battery module composed of at least one battery cell first, and then configure a battery pack by using at least one battery module and adding other components. The battery cells configuring the battery module or the battery pack are generally pouch-type secondary batteries that may be easily stacked on one another.

A conventional battery pack includes at least one battery module including at least one battery cell, at least one terminal connected to the at least one battery module and connected to an external power source or the like, and a pack case for exposing the at least one terminal to the exterior and packaging the at least one battery module. In particular, the conventional battery pack generally further includes a terminal cover detachably coupled to the pack case to protect a terminal exposed to the exterior when the battery pack is carried for transportation or the like. The conventional terminal cover is generally detached from the pack case by a rotation operation due to a user manipulation.

However, the conventional terminal cover is easily worn by the rotation due to the user manipulation, which weakens the fastening force with the pack case and damages the pack case.

Moreover, in the case of the conventional terminal cover, it may be difficult for the user to rotate the terminal cover by bare hands without coated gloves. In other words, the conventional terminal cover is more difficult to manipulate depending on the state of the hands of the user.

Thus, it is required to provide a terminal cover and a battery pack including the terminal cover, which may prevent a pack case from being damaged due to the detachment and may also allow easier detachment.

DISCLOSURE

Technical Problem

The present disclosure is directed to providing a terminal cover, which may prevent a pack case from being damaged due to the attachment and detachment, and a battery pack including the terminal cover.

In addition, the present disclosure is also directed to providing a terminal cover, which may allow easier attachment and detachment, and a battery pack including the terminal cover.

Technical Solution

In one aspect of the present disclosure, there is provided a terminal cover, which covers a terminal of a battery pack and is detachably mounted to the battery pack, the terminal cover including a cover body coupled to a pack case of the battery pack by hook coupling; and a detachment guide unit provided at both side surfaces of the cover body to allow the hook coupling of the cover body to be released based on pressing by a user.

A hook may be provided at one side of a bottom portion of the cover body to be coupled to the pack case by hook coupling, and the detachment guide unit may be spaced apart from the hook by a predetermined distance and may be elastically deformed by the pressing of the user to separate the hook from the pack case.

The detachment guide unit may be formed integrally with the cover body.

The detachment guide unit may be disposed to be spaced apart from the pack case by a predetermined distance to form a predetermined space for elastic deformation.

The cover body may be made of a flexible material that is elastically deformable.

The terminal cover may further include an elastic spacer provided at an inner surface of the cover body and disposed between the inner surface of the cover body and an outer surface of the terminal when the terminal cover is mounted.

In addition, the present disclosure also provides a battery pack including at least one terminal cover described herein; at least one terminal that is covered by the terminal cover; a battery module electrically connected to the at least one terminal; and a pack case configured to package the battery module.

The pack case may have a hooking portion coupled to the cover body by hook coupling.

Advantageous Effects

According to various exemplary embodiments as described above, it is possible to provide a terminal cover and a battery pack including the terminal cover, which may prevent a pack case from being damaged due to the attachment and detachment.

In addition, according to various exemplary embodiments of the present disclosure, it is possible to provide a terminal cover and a battery pack including the terminal cover, which may allow easier attachment and detachment.

DESCRIPTION OF DRAWINGS

The accompanying drawings illustrate a preferred exemplary embodiment of the present disclosure and together with the foregoing disclosure, serve to provide further understanding of the technical features of the present disclosure, and thus, the present disclosure is not construed as being limited to the drawing.

BEST MODE

The present disclosure will become more apparent by describing in detail the exemplary embodiments of the present disclosure with reference to the accompanying drawings. It should be understood that the exemplary embodiments disclosed herein are illustrative only for better understanding of the present disclosure, and that the present disclosure may be modified in various ways. In addition, for ease of understanding of the present disclosure, the accompanying drawings may not be drawn to scale, but the dimensions of some components may be exaggerated.

Figure 1:
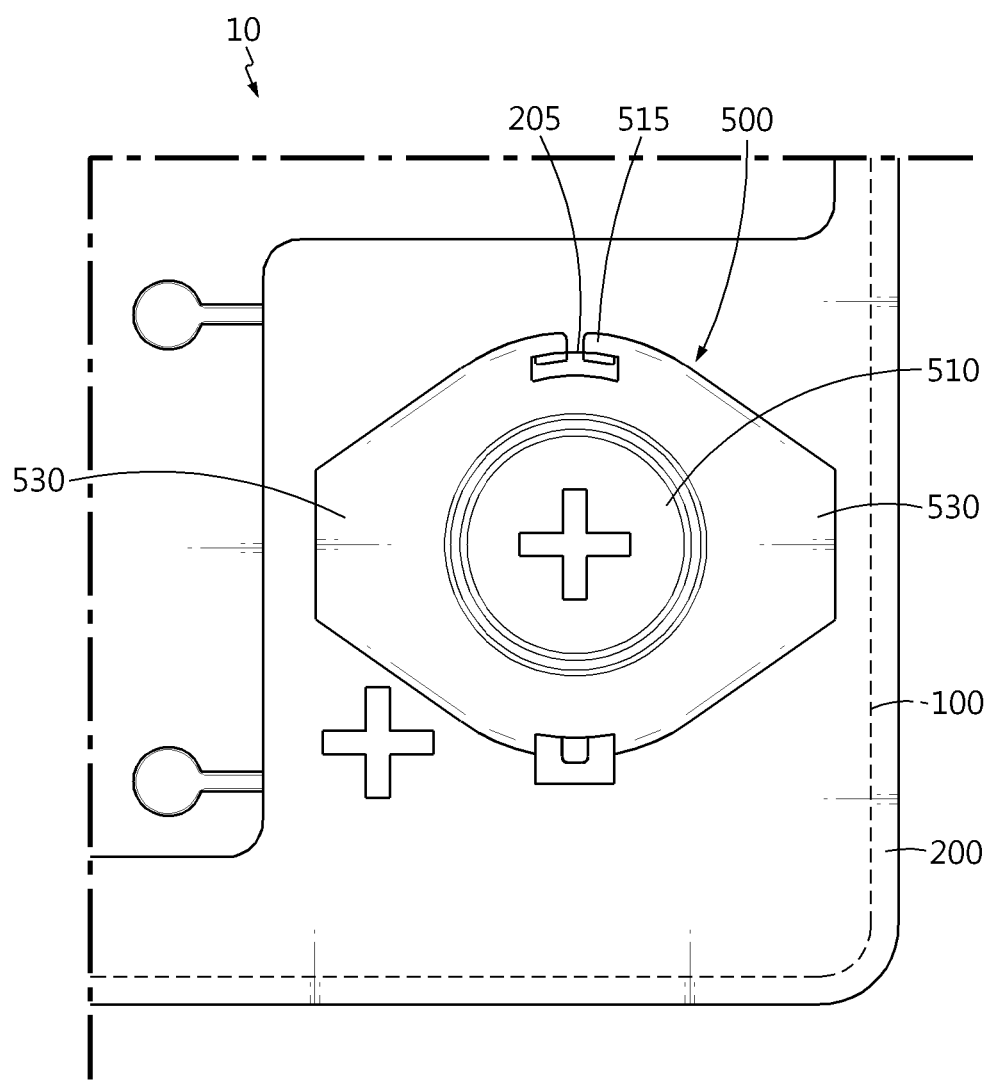
FIG. 1 is a diagram for illustrating a battery pack according to an exemplary embodiment of the present disclosure.
Figure 2:
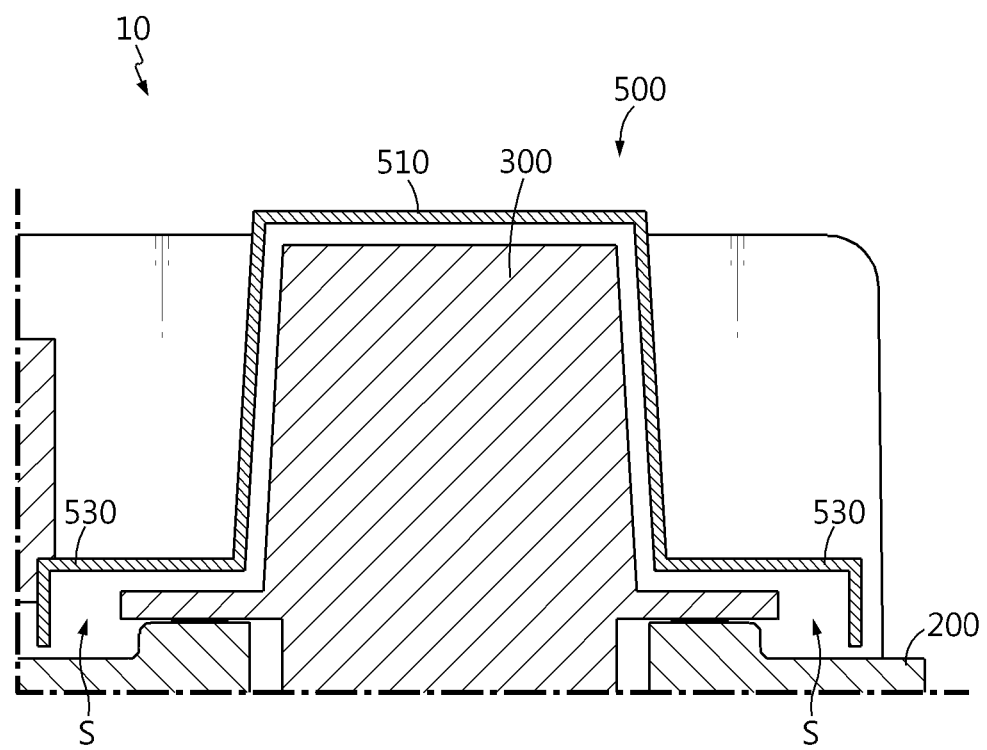
FIG. 2 is a cross-sectional view showing main parts of the battery pack of FIG. 1.

FIG. 1 is a diagram for illustrating a battery pack according to an exemplary embodiment of the present disclosure, and FIG. 2 is a cross-sectional view showing main parts of the battery pack of FIG. 1.

Referring to FIGS. 1 and 2, a battery pack 10 may include a battery module 100, a pack case 200, a terminal 300, and a terminal cover 500.

The battery module 100 may include at least one battery cell, or a plurality of battery cells. The at least one battery cell or the plurality of battery cells may be provided as a secondary battery, for example, a pouch-type secondary battery.

At least one battery module 100 or a plurality of battery modules 100 may be provided. The number of battery modules 100 may be determined depending on the required battery capacity.

The pack case 200 may package the battery module 100 and form the exterior of the battery pack 10. The pack case 200 may have an accommodation space for accommodating the battery module 100.

The pack case 200 may have a hooking portion 205.

The hooking portion 205 is used for coupling with a terminal cover 500, to be explained later, and the hooking portion 205 may fix a hook 515 of the terminal cover 500, to be explained later, to fix the terminal cover 500 to the pack case 200.

The terminal 300 is used for connecting the battery module 100 to an external power source and may be electrically connected to the battery module 100. The terminal 300 may be exposed to exterior of the pack case 200.

The terminal 300 may be provided in plural, and the plurality of terminals 300 may protrude to exterior of the pack case 200 to be partially exposed to exterior of an outer surface of the pack case 200.

The terminal cover 500 is used for protecting the terminal 300 and may cover the terminal 300 exposed to exterior of the pack case 200. The terminal cover 500 may be mounted to the pack case 200. Further, the terminal cover 500 may be detachably mounted to the pack case 200 for the connection between the terminal 300 and the external power source.

The terminal cover 500 may include a cover body 510 and a detachment guide unit 530.

The cover body 510 may cover the terminal 300 when the terminal cover 500 is mounted to the pack case 200. The cover body 510 may be made of a flexible material that is elastically deformable.

The cover body 510 may be detachably coupled to the pack case 200 by hook coupling.

For the hook coupling, the cover body 510 may have a hook 515.

The hook 515 may be provided at one side of a bottom portion of the cover body 510 and may be detachably coupled to the pack case 200 by hook coupling. Specifically, the hook 515 may be detachably coupled to the hooking portion 205 of the pack case 200 by hook coupling.

The detachment guide unit 530 may be provided at both side surfaces of the cover body 510 and may be formed integrally with the cover body 510. In addition, the detachment guide unit 530 may be made of the same material as the cover body 510. Accordingly, the detachment guide unit 530 may be made of a flexible material that is elastically deformable, identical to the cover body 510.

The detachment guide unit 530 may release the hook coupling of the cover body 510 based on a pressing by a user. Specifically, the detachment guide unit 530 may be spaced apart from the hook 515 by a predetermined distance, and the detachment guide unit 530 may be elastically deformed by the pressing by the user to separate the hook 515 from the pack case 200, thereby releasing the hook coupling.

The detachment guide unit 530 may be spaced apart from the pack case 200 by a predetermined distance to facilitate the elastic deformation. Accordingly, a predetermined space S may be formed between the detachment guide unit 530 and the pack case 200.

Hereinafter, the releasing operation of the terminal cover 500 according to the exemplary embodiment will be described in more detail.

Figure 3:
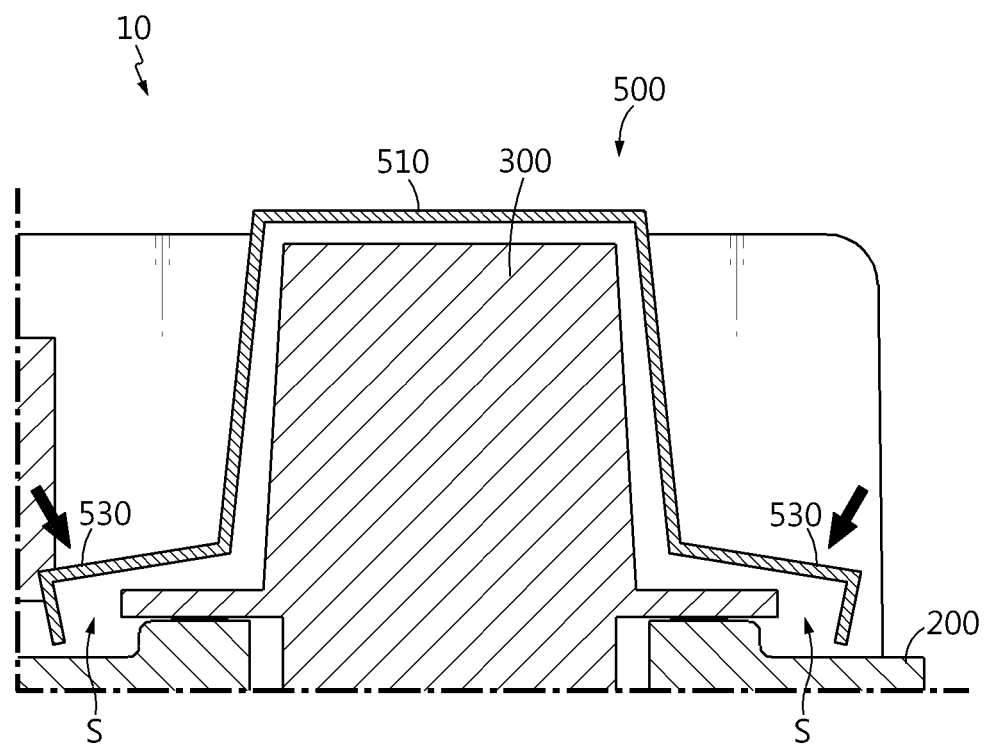
FIGS. 3 and 4 are diagrams for illustrating a detachment operation of the terminal cover of the battery pack of FIG. 1.
Figure 4:
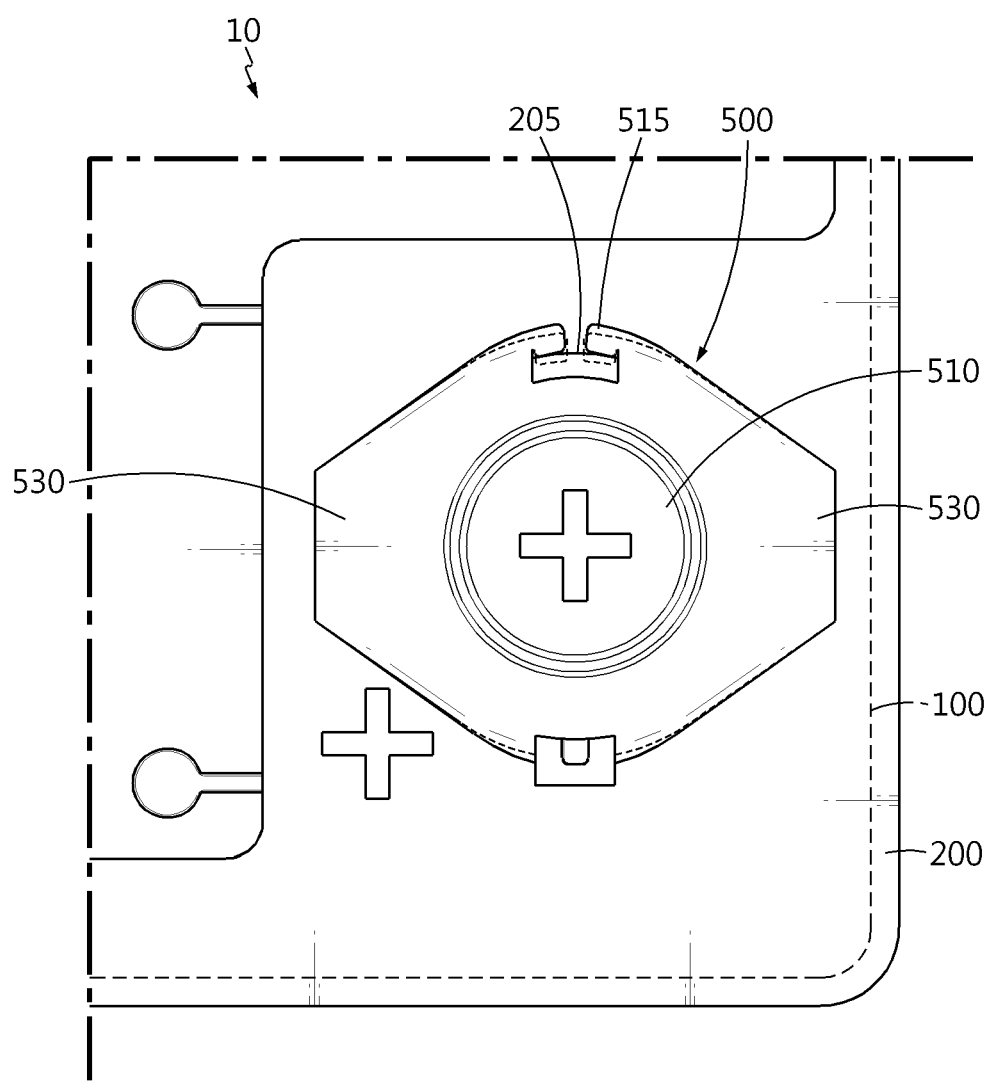

FIGS. 3 and 4 are diagrams for illustrating a detachment operation of the terminal cover of the battery pack of FIG. 1.

Referring to FIGS. 3 and 4, when the battery pack 10 is carried for transportation or the like, in the battery pack 10, the terminal cover 500 may be mounted to the pack case 200 by hook coupling to protect the terminal 300.

Subsequently, upon completion of carrying the battery pack 10 for transportation or the like, the terminal cover 500 may need to be detached from the pack case 200 for the connection of the terminal 300 to an external power source.

When the terminal cover 500 is detached, the user such as a worker may press both sides of the detachment guide unit 530 disposed at both sides of the cover body 510 of the terminal cover 500. When the detachment guide unit 530 disposed at both left and right sides of the cover body 510 is elastically deformed near the predetermined space S due to the pressing by the user, both upper and lower sides of the cover body 510 may also be elastically deformed in a vertical direction.

The hook 515 of the cover body 510 may be released from the hooking portion 205 of the pack case 200 due to the elastic deformation of the cover body 510 in the vertical direction to allow the hook coupling between the terminal cover 500 and the pack case 200 to be decoupled.

As described above, in this exemplary embodiment, the terminal cover 500 may be detached as the user grips the detachment guide unit 530, rather than using the conventional rotating structure. Accordingly, in this exemplary embodiment, since an elastic force due to the pressing by the user is used instead of the frictional force in the conventional rotating structure, the pack case 200 may be prevented from abrasion or breakage due to friction.

Moreover, in this exemplary embodiment, since the terminal cover 500 is detached from the pack case 200 due to the elastic deformation caused by the pressing of the user, the terminal cover 500 may be attached or detached more easily by bare hands of the user.

Figure 5:
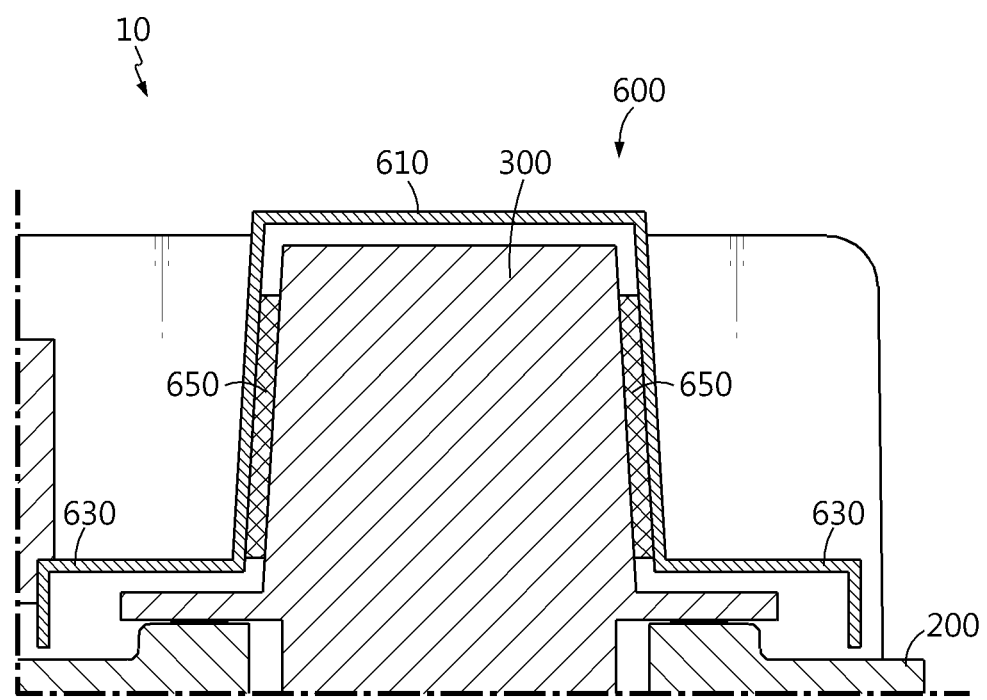
FIG. 5 is a diagram for illustrating a terminal cover according to another exemplary embodiment of the battery pack of FIG. 1.

FIG. 5 is a diagram for illustrating a terminal cover according to another embodiment, employed at the battery pack of FIG. 1.

The terminal cover 600 of this exemplary embodiment is similar to the terminal cover 500 of the foregoing exemplary embodiment, and the following description will be focused on features different from the foregoing exemplary embodiment.

Referring to FIG. 5, the terminal cover 600 may include a cover body 610, a detachment guide unit 630, and an elastic spacer 650.

The cover body 610 and the detachment guide unit 630 are substantially identical or similar to the cover body 510 and the detachment guide unit 530 of the foregoing exemplary embodiment and thus will not described in detail again.

The elastic spacer 650 may be disposed at an inner surface of the cover body 610 and may be disposed between the inner surface of the cover body 610 and the outer surface of the terminal 300 when the terminal cover 600 is mounted to the pack case 200.

The elastic spacer 650 may be made of a rubber material having elasticity. For example, the elastic spacer 650 may be made of a silicone rubber, a styrene butadiene rubber, or the like.

The elastic spacer 650 of this exemplary embodiment is in close contact with the outer surface of the terminal 300 within the cover body 610 and thus may more reliably prevent the terminal cover 600 from being unexpectedly released when the terminal cover 600 is mounted to the pack case 200, thereby enhancing the coupling stability of the terminal cover 600.

According to various exemplary embodiments as described above, it is possible to provide the terminal cover 500, 600 and the battery pack 10 that includes the terminal cover 500, 600, which may prevent the pack case 200 from being damaged due to attachment and detachment.

In addition, according to various exemplary embodiments of the present disclosure, it is possible to provide the terminal cover 500, 600 and the battery pack 10 that includes the terminal cover 500, 600, which allows easier attachment and detachment.

While the exemplary embodiments of the present disclosure have been shown and described, it should be understood that the present disclosure is not limited to the specific exemplary embodiments described, and that various changes and modifications can be made within the scope of the present disclosure by those skilled in the art, and these modifications should not be understood separately from the technical ideas and views of the present disclosure.

What is claimed is:

1. A terminal cover, which covers a terminal of a battery pack and is detachably mounted to the battery pack, the terminal cover comprising:
    a cover body coupled to a pack case of the battery pack by hook coupling; and
    a pair of detachment guides provided at opposite side surfaces of the cover body to allow the hook coupling of the cover body to be released based on pressing of the detachment guides towards each other by a user,
    wherein the pair of detachment guides are provided at first and second circumferential positions, respectively,
    wherein a hook is provided at one side of a bottom portion of the cover body to be coupled to the pack case by hook coupling, the hook being located at a third circumferential position between the first and second circumferential positions, the hook being spaced apart from the pair of detachment guides in a circumferential direction, and the hook being located outward of the cover body, and
    wherein the hook is displaced away from a center of the cover body when the detachment guides are pressed towards each other.

2. The terminal cover according to claim 1, wherein the detachment guides are spaced apart from the hook by a predetermined distance and are elastically deformed by the pressing of the user to separate the hook from the pack case.

3. The terminal cover according to claim 1, wherein the detachment guides, the hook, and the cover body are formed as a single, one piece body.

4. The terminal cover according to claim 2, wherein the detachment guides are disposed to be spaced apart from the pack case by a predetermined distance to form a predetermined space for elastic deformation.

5. The terminal cover according to claim 1, wherein the cover body is made of a flexible material that is elastically deformable.

6. The terminal cover according to claim 1, further comprising:
    an elastic spacer provided at an inner surface of the cover body and disposed between the inner surface of the cover body and an outer surface of the terminal when the terminal cover is mounted.

7. A battery pack, comprising:
    at least one terminal cover according to claim 1;
    at least one terminal covered by the terminal cover;
    a battery module electrically connected to the at least one terminal; and
    a pack case configured to package the battery module.

8. The battery pack according to claim 7, wherein the pack case has a hooking portion coupled to the hook of the cover body by hook coupling.

9. The terminal cover of claim 6, wherein a lowermost portion of the elastic spacer is higher than the pair of detachment guides.

* * * * *